(12) United States Patent
Sprott et al.

(10) Patent No.: US 7,871,236 B1
(45) Date of Patent: Jan. 18, 2011

(54) AUTOMATED PAPER TURNER FOR WORK AND TURN PRINTING OPERATION

(76) Inventors: Kenneth Sprott, 1516 Portola St., Davis, CA (US) 95616; Shawn Malakiman, 2158 Paseo Del Oro, San Jose, CA (US) 95124

( * ) Notice: Subject to any disclaimer, the term of this patent is extended or adjusted under 35 U.S.C. 154(b) by 306 days.

(21) Appl. No.: 12/150,533

(22) Filed: Apr. 29, 2008

(51) Int. Cl.
*H01L 21/68* (2006.01)

(52) U.S. Cl. .................. 414/773; 414/763; 414/782

(58) Field of Classification Search .................. 414/405, 414/421, 425, 622, 729, 738, 758, 763, 766, 414/776, 777–780, 907
See application file for complete search history.

(56) References Cited

U.S. PATENT DOCUMENTS

| | | | | |
|---|---|---|---|---|
| 3,072,266 A | * | 1/1963 | Holcroft .................. | 198/346.1 |
| 3,302,768 A | * | 2/1967 | Copper .................... | 198/376 |
| 3,403,768 A | * | 10/1968 | Tobey et al. ............. | 198/404 |
| 3,930,643 A | * | 1/1976 | Moore ..................... | 269/58 |
| 4,046,272 A | * | 9/1977 | Hayward .................. | 414/419 |
| 5,141,388 A | * | 8/1992 | Georgitsis et al. ........ | 414/783 |
| 5,743,374 A | * | 4/1998 | Monsees .................. | 198/403 |
| 6,253,980 B1 | * | 7/2001 | Murakami et al. .......... | 224/510 |

FOREIGN PATENT DOCUMENTS

DE         3414516 A1 * 11/1985

* cited by examiner

*Primary Examiner*—Gregory W Adams
(74) *Attorney, Agent, or Firm*—GSS Law Group (57) ABSTRACT

A powered paper turner is an automated load turning device specifically designed to turn a paper stack sandwiched between a pair of pallets in a work and turn printing process. The paper turner is mounted on wheels, with a rotating module rotating about an axle mounted on a moving support beam to give the module its rotational capability. A slide that secures the paper stack moves horizontally within the rotating module to shift the center of gravity. As the support beam moves up and down a pair of guide rods on linear bearings, the rotating module rotates about the axle. During a downstroke of the moving support beam, the paper stack rotates from a vertical position to a horizontal position. The stack is then shifted, so that during an upstroke of the moving support beam, the paper stack completes a 180° rotation.

6 Claims, 9 Drawing Sheets

AUTOMATED PAPER TURNER FOR WORK AND TURN PRINTING OPERATION

BACKGROUND OF THE INVENTION

1. Field of the Invention

The present invention relates generally to equipment used in the printing industry, and more particularly is an automated paper turner for a work and turn printing operation.

2. Description of the Prior Art

The printing industry requires a good deal of high cost capital equipment. Much of the cost of a given printing job is due to the expense of the printing presses. A simple, low end press costs $100,000, and a high end, multi-color press costs millions of dollars. Multi-color presses typically require more than one press operator—a head press man and at least one press helper. The head press man sets up the color and the registration, and the press helper feeds the paper. If a particular shop cannot afford the expense of the press helper, then the head press man does both the set-up work and the paper feeding. This situation significantly slows the pace of production.

Printing presses are also distinguished by whether they print on only one side of the paper on a given run (a straight press), or whether they print on both sides of the paper simultaneously (a perfecting press). The distribution of these machines in the printing industry is roughly 90%/10%, with the straight presses being the far more common machine. This means that the majority of printing work is done on a straight press, printing on one side at a time, even though most printing jobs require printing on two sides.

Therefore, most of the time a "work and turn" operation is required. That is, the first side is printed, then the paper is flipped over, and the second side is printed by running the paper through the same press a second time. The turning operation is generally accomplished manually, by either the head press man or the press helper. The turner must take the stack of paper printed on one side back to the feeding area at the rear of the press, turn the paper, usually in stacks of two to three inches, and feed the paper back into the press. This is clearly a time consuming operation, and if there is only a single press operator, the operator has to monitor the colors and the registration while feeding the press. This arrangement slows the operation and can adversely affect the print quality.

The prior art automation solution for the work and turn operation is a hydraulic turning machine. The hydraulic turning machine clamps the paper to be turned tightly on both the top and bottom of the paper, lifts the stack of paper, and turns it. This is a costly solution to the work and turn problem, in that the automatic turning machines cost from $17,000 to $30,000. Moreover, the automatic turning machines can create yet another problem. The pressure used by the machines to secure the paper can offset the print if the printed material is not allowed to thoroughly dry before the turning operation. If you turn the printed paper too soon, the work is destroyed. If you wait too long for the ink to dry, delay is introduced into the printing process.

One more economical method of automating the turning process to some degree is found in co-inventor Malakiman's U.S. Pat. No. 6,626,631, "Paper Turner for Work and Turn Printing Operation", issued Sep. 30, 2003. The Malakiman device includes a pair of slides to hold a paper stack, the slides being mounted on a pair of parallel tracks. To turn the paper stack, the paper turner is positioned so that a first slide is under the pallet on which the paper stack rests. The second slide is lowered to rest on top of the paper stack, and the slides are locked in position relative to each other. The paper turner is then turned, using wheels to support the weight, until the paper stack is in a substantially horizontal position. The slides and the stack are then moved to the opposite end of the tracks. The paper turner is again rotated until it is in a vertical orientation, rotated 180° from its original position. The printed sides of the paper are now facing downward, and the paper is ready to be loaded into the printing press to print the second side. While the Malakiman device is easy to use and inexpensive, a work and turn operation using the Malakiman device does still entail a good deal of manual labor.

Accordingly, it is an object of the present invention to provide a method of fully automating the work and turn operation.

It is a further object of the present invention to provide a turning mechanism that allows the turn operation to be completed immediately after the first printing run without a likelihood of offsetting print, even if the paper is turned before the ink has dried.

It is a still further object of the present invention to provide an automated turning machine that is relatively inexpensive, and that is easy to use.

SUMMARY OF THE INVENTION

The present invention is a powered paper turner that is an automated load turning device specifically designed to turn a paper stack sandwiched between a pair of pallets in a work and turn printing process.

The paper turner comprises a main frame mounted on wheels. An axle of a rotating module is mounted on a moving support beam on a pair of bearings within the main frame. Movement of the rotating module about the axle gives the module its rotational capability.

A slide that secures the paper stack moves horizontally within the rotating module to shift the center of gravity. A scissor mechanism raises and lowers the moving support beam during the turning operation. As the support beam moves up and down a pair of guide rods on linear bearings, the rotating module rotates about the axle. During a first downstroke of the moving support beam, rollers on a first side of the turner cause the paper stack to rotate from a vertical position to a horizontal position.

When the paper stack is in the horizontal position, the stack is shifted, so that during an upstroke of the moving support beam, the paper stack completes a 180° rotation as it is rotated by a second set of rollers on the turner.

An advantage of the present invention is that it turns a paper stack quickly and easily.

Another advantage of the present invention is that it provides a powered means for the turning operation.

A still further advantage of the present invention is that the device is relatively inexpensive to manufacture.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
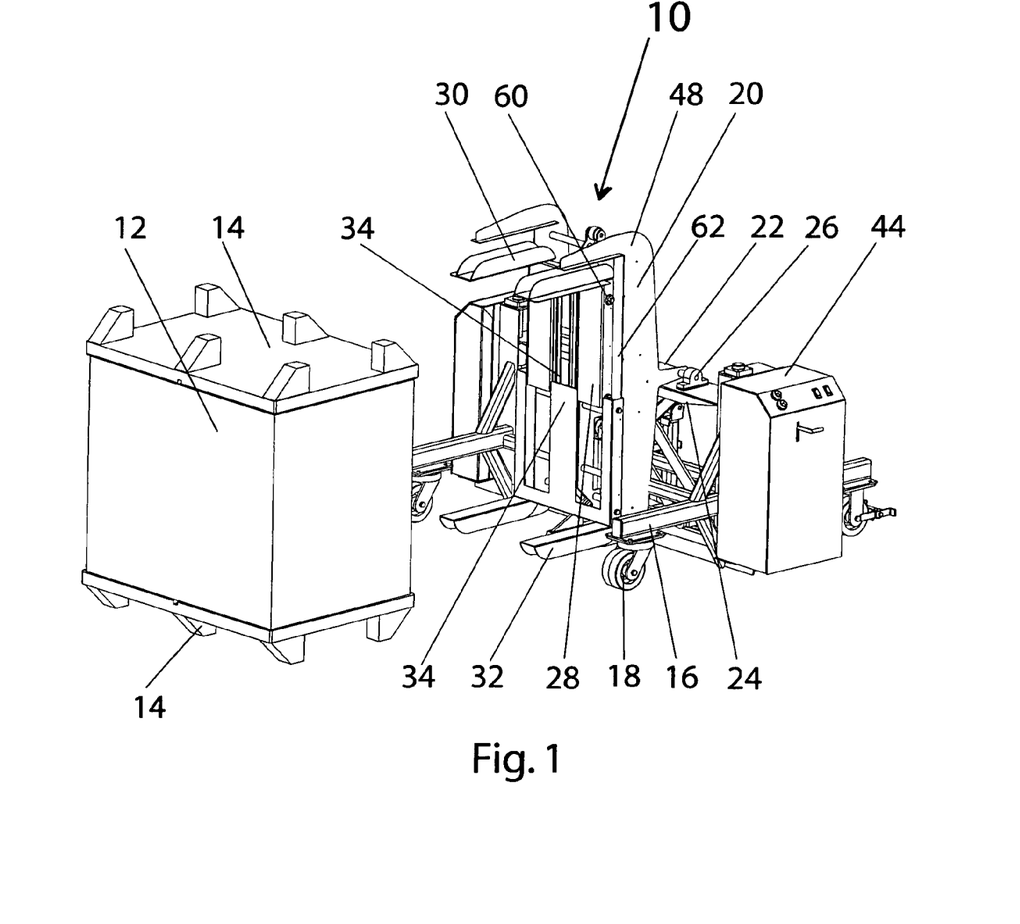
FIG. 1 is a left side perspective view of the paper turner of the present invention and a paper stack with the paper stack prepared to be loaded into the paper turner.

Referring first to FIG. 1, the present invention is a powered paper turner 10. The powered paper turner 10 is an automated load turning device specifically designed to turn a paper stack 12 sandwiched between a pair of pallets 14 in a work and turn printing process.

The paper turner 10 comprises a main frame 16 that is mounted on wheels 18 to make the device portable. The main frame 16 can be constructed in many conformations, so long as the frame 16 is sufficiently sturdy to support a rotating module 20. In the preferred embodiment, an axle 22 of the rotating module 18 is mounted on a moving support beam 24 with a pair of bearings 26. Movement about the axle 22 on bearings 26 gives the module 20 its rotational capability.

The rotating module 18 comprises a slide 28. The slide 28 comprises two opposable elements, a first slide clamp 30 and a second slide clamp 32, that are mounted on a mounting bar 34. The slide clamps 30, 32 are movable relative to each other. When the slide clamps 30, 32 are in the proper position above and beneath the paper stack 12, a locking mechanism on the mounting bar 34 is secured to fix the slide clamps 30, 32 in position.

Figure 2:
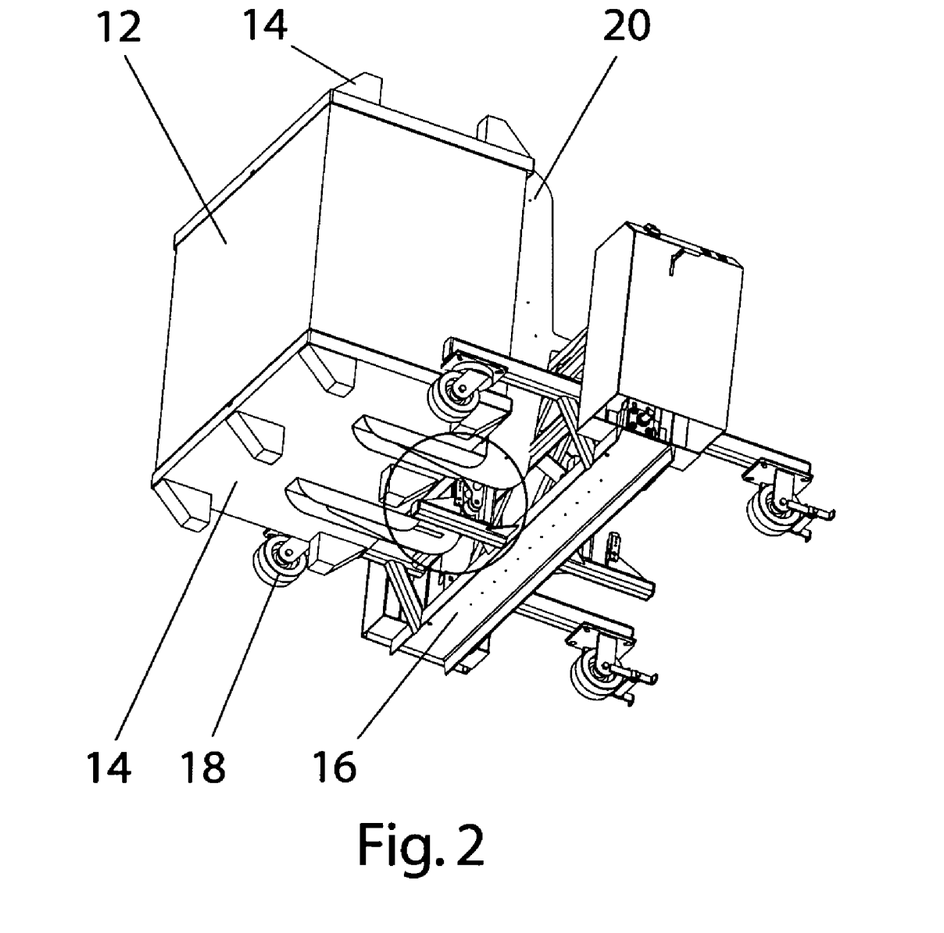
FIG. 2 is a left side perspective view of the paper turner with the paper stack loaded and ready to be raised.
Figure 3:
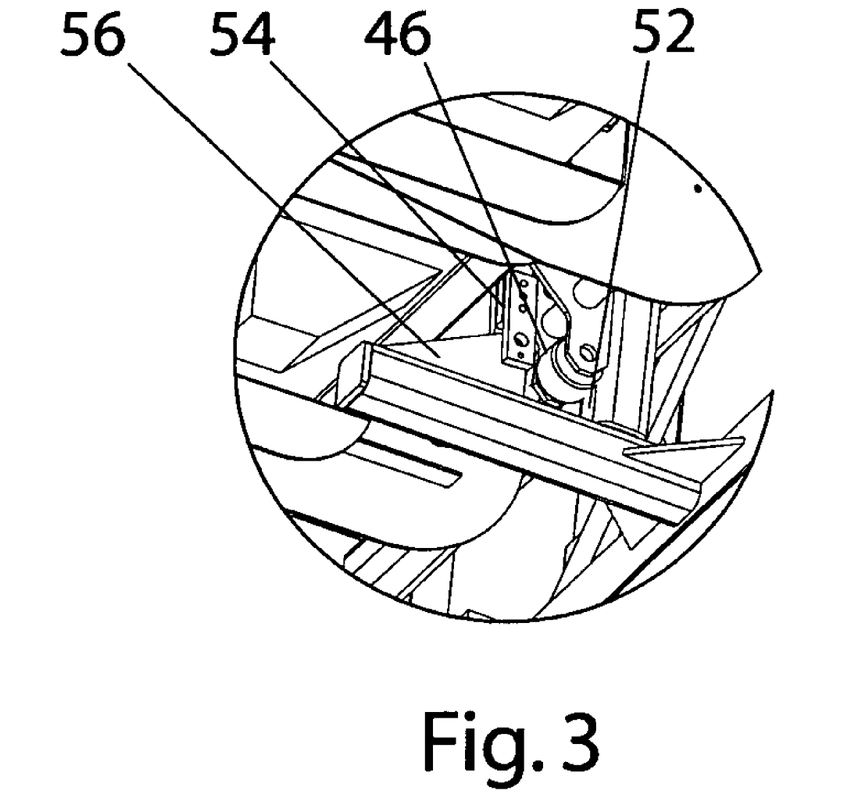
FIG. 3 is a detail view of the area circled in FIG. 2.

Referring now to FIG. 2, vertical and rotational motion of the rotating module 20 is provided by a scissor mechanism 36 that raises and lowers the moving support beam 24. The support beam 24 is mounted via a pair of linear bearings 38 that move up and down on a pair of guide rods 40. Power is supplied to the scissor mechanism 36 by a motor 42 housed in cabinet 44. When the motor 42 is activated, the scissor mechanism 36 is expanded and contracted, thereby moving the support beam 24 up and down the guide rods 40 on linear bearings 38.

As the support beam 24 moves up and down, the rotating module 20 rotates about axle 22. As the rotating module 20 rotates, the weight of the paper stack 12 and the rotating module 20 is borne by, and the rotational motion is guided by, a pair of module rollers 46 located at either end of a support frame 48 of the rotating module 20, and a pair of frame rollers 50 mounted on upright members 52 of the main frame 16. While only one of each of the rollers 46, 50 is visible in FIG. 2, it should be recognized that the paper turner 10 is symmetrical about its center line, so that the other rollers 46, 50 are mounted on mirror image components—the other end of the support frame 48 and the second upright member 52—which are blocked from view in FIG. 2 by the scissor mechanism 36 and the moving support beam 24. When the rotating module 20 is being raised and lowered, module rollers 46 move along upright members 52. As the rotating module 20 rotates, the module rollers 46 move along a respective track switch lever 54 and a rotation ramp 56. When the rotating module 20 is on its downward path, and rotation has commenced by the module roller 46 contacting the upright member 52, frame roller 50 contacts and moves along a rotation guide 58 to complete the rotation of the rotating module 20.

Figure 7:
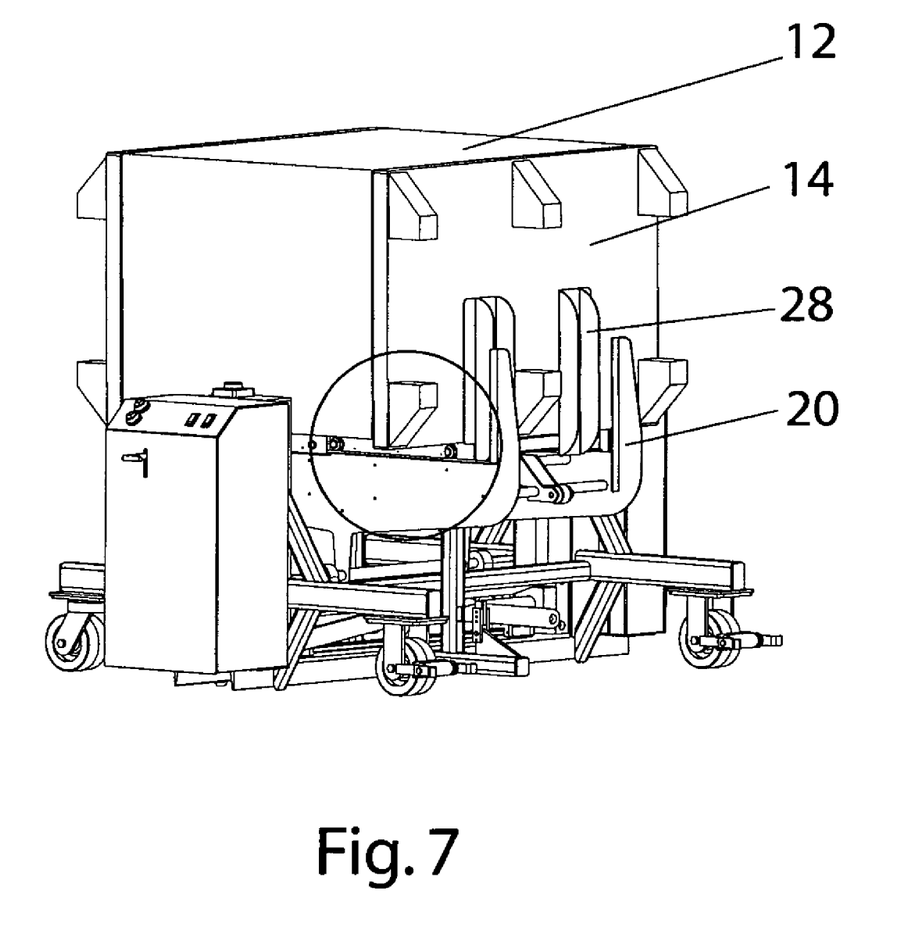
FIG. 7 is a right side perspective view of the paper turner with the paper stack in a horizontal position.
Figure 8:
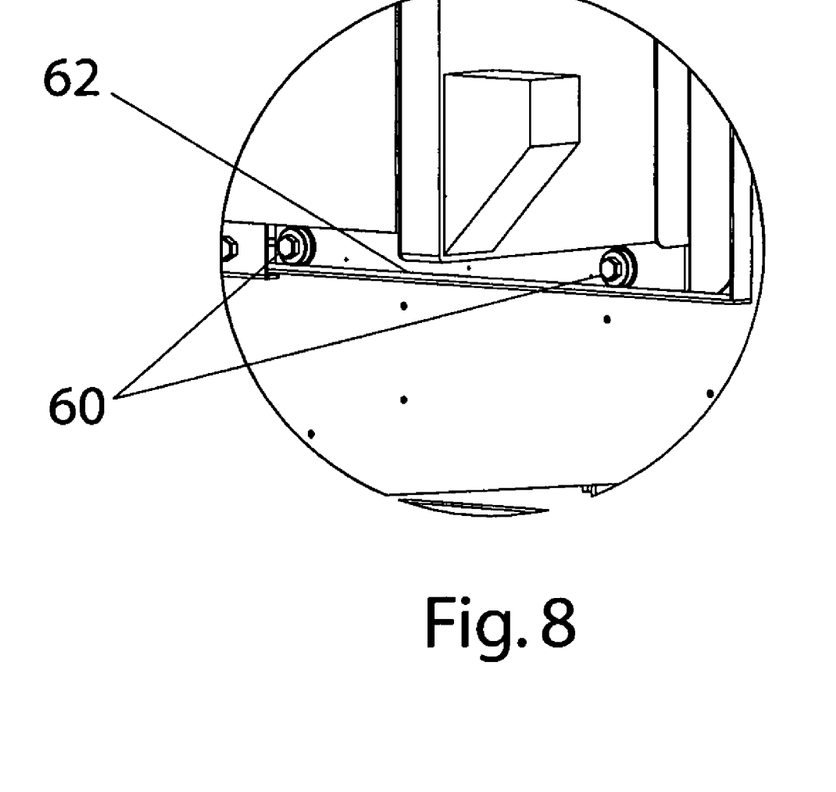
FIG. 8 is a detail view of the area circled in FIG. 7.

When the rotating module 20 is in the substantially horizontal position shown in FIG. 7, slide 28 moves horizontally within rotating module 20 on rollers 60 that roll along slide track 62. The rollers 60 and slide track 62 are most clearly seen in FIG. 8. The movement of the slide 28 along track 62 shifts the center of gravity of the rotating module 20. It should be noted that the rotating module 20 rotates slightly about axle 22 in the frame 16 of the turner 10. Thus when the slide 28 is moved from one end of the rotating module 20 to the other, the rotating module 20 tilts in the direction the slide 28 is moved. This enables the second side of the turner 10 to come into play as the scissor mechanism 36 makes a second stroke along the guide rods 40 as described below.

Operation of the powered load turner 10 is as follows:

As illustrated in FIG. 1, the turning operation is initiated with a paper stack 12 resting on a first pallet 14, with a second pallet 14 placed upside down on the top surface of the paper stack 12. The locking mechanism on the mounting bar 34 is released to allow the first slide clamp 30 to be raised to a height sufficient to clear the top of the second pallet 14. The paper turner 10 is moved forward until the second slide clamp 32 is under the first pallet 14 beneath the paper stack 12. The position of the first slide clamp 30 is then adjusted so that the first slide clamp 30 contacts the top of the second pallet 14. The slide clamps 30, 32 are then locked in position on the mounting bar 34, so that the paper stack 12 is secured in the slide 28.

Figure 6:
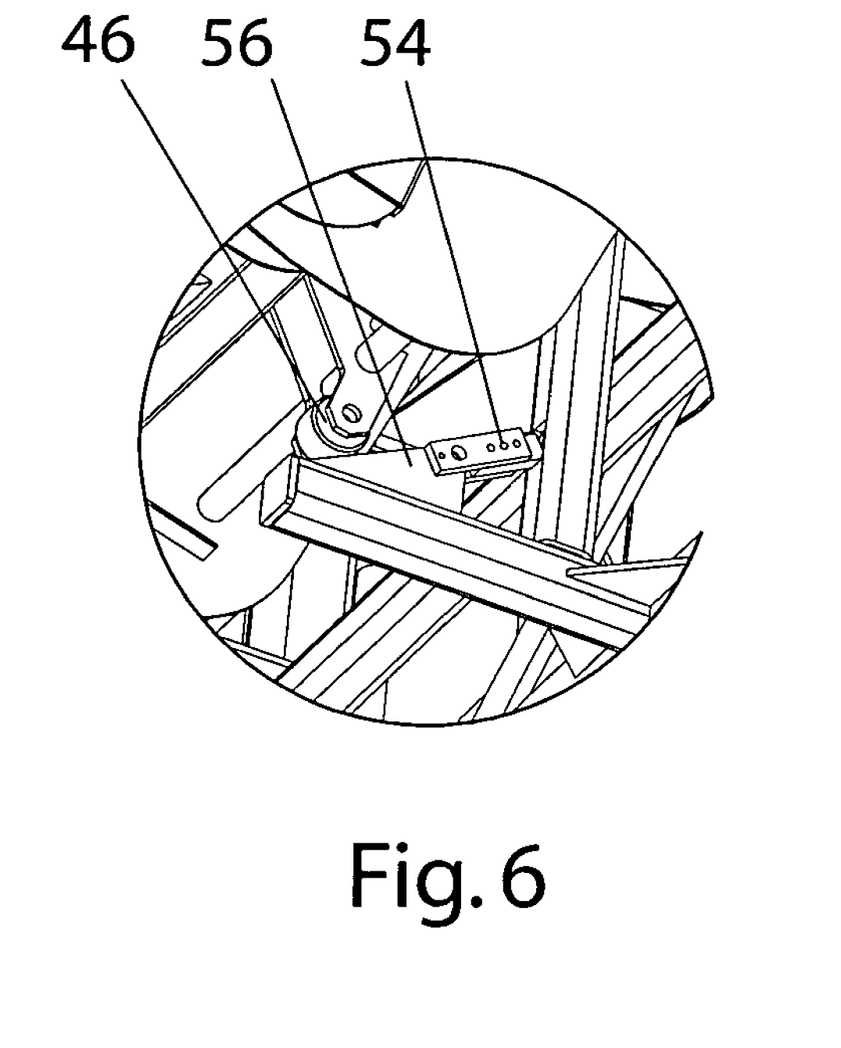
FIG. 6 is a detail view of the area circled in FIG. 5.

Referring now to FIG. 2, the rotating module 20 with the paper stack 12 is raised by the scissor mechanism 36 lifting the moving support beam 24. Module roller 46 moves upward along the upright member 52 until both of the module rollers 46 have cleared the top of the respective track switch levers 54. When the paper stack 12 has been raised enough so that module rollers 46 are above the track switch levers 54, the track switch levers 54 are lowered so that tracks are formed by each switch lever 54 and its corresponding rotation ramp 56 as illustrated in FIG. 6.

Figure 4:
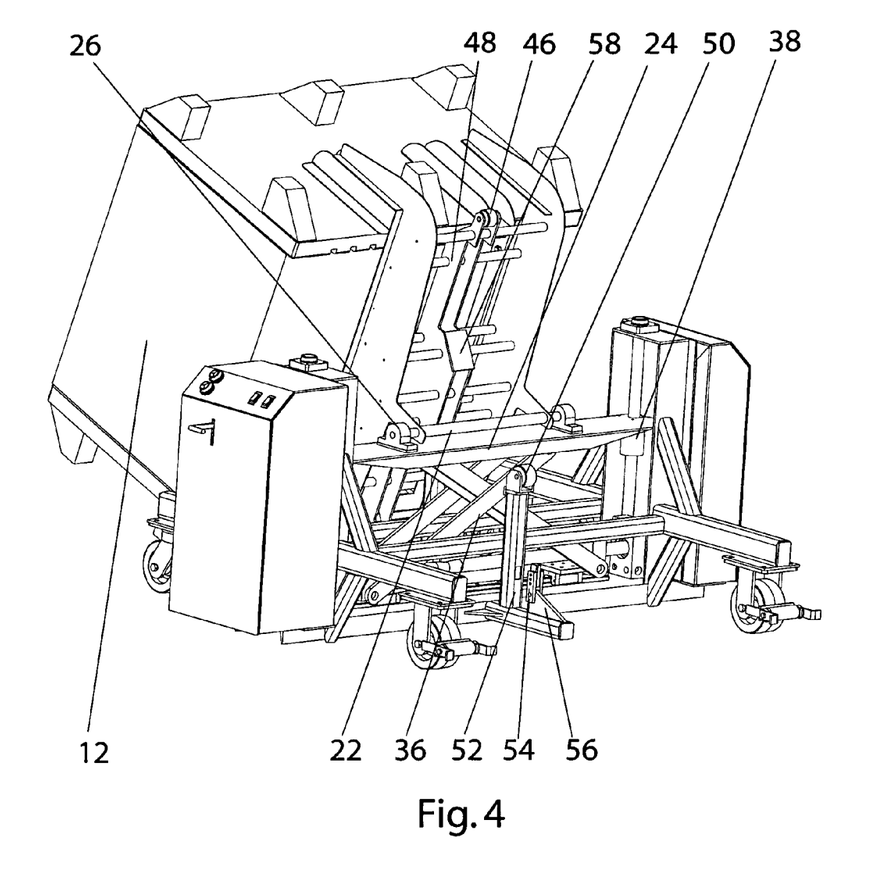
FIG. 4 is a right side perspective view of the paper turner with the paper stack loaded and in the first stage of the turning operation.
Figure 5:
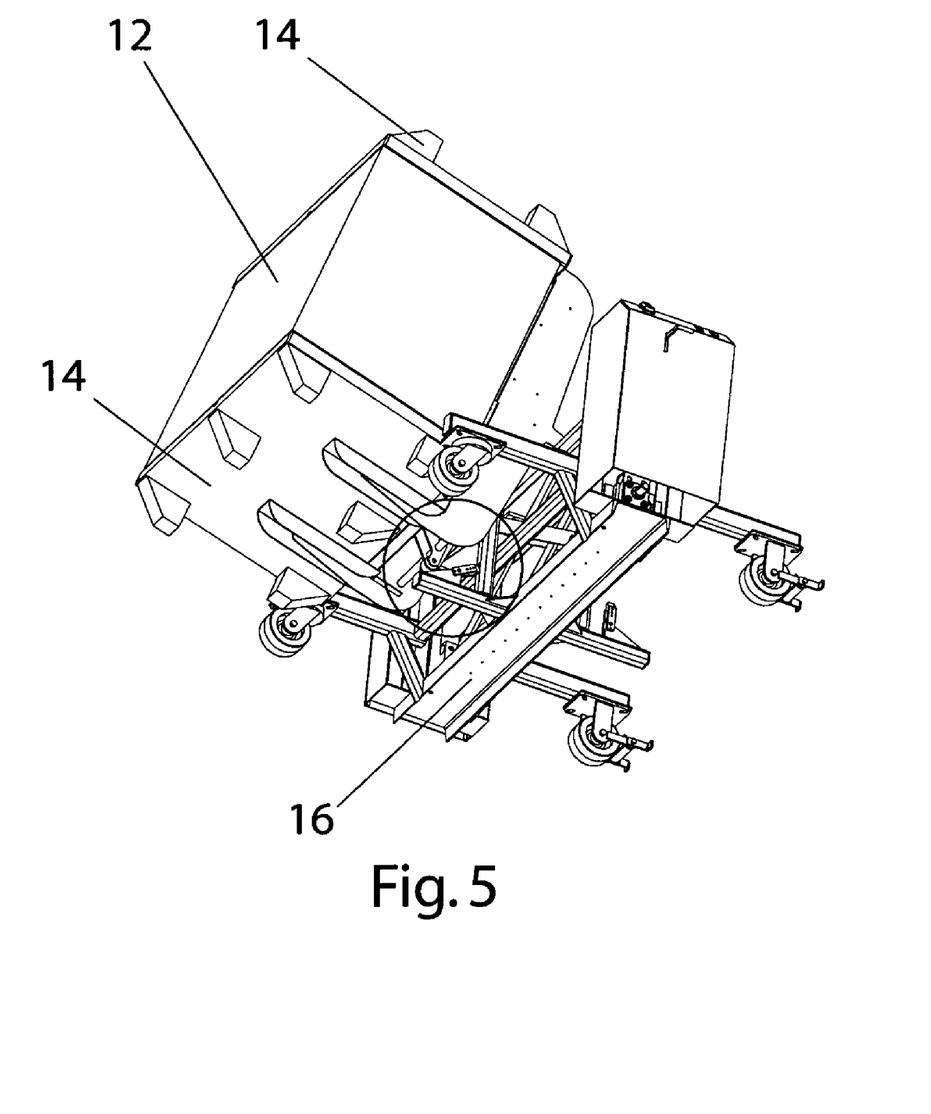
FIG. 5 is a left underside perspective view of the paper turner with the paper stack loaded and in the first stage of the turning operation.

The scissor mechanism 36 is then lowered. As the module roller 46 contacts and moves down the ramp formed by the switch lever 54 and rotation ramp 56, rotation of the rotating module 20 by the first rotation mechanism begins, as shown in FIGS. 4-6. The scissor mechanism 36 continues to lower the rotating module 20 so that the frame roller 50 contacts the rotation guide 58. When the scissor mechanism 36 is completely lowered, the rotating module 20 reaches the horizontal position shown in FIG. 7.

To complete the rotation of the rotating module 20, the slide 28 is pushed to the opposite end of its travel path in the rotating module 20. This shifts the center of gravity of the rotating module 20, so that the mirror image second side of the turner 10 comes into play as the scissor mechanism 36 drives the moving support beam 24 up and down.

Figure 9:
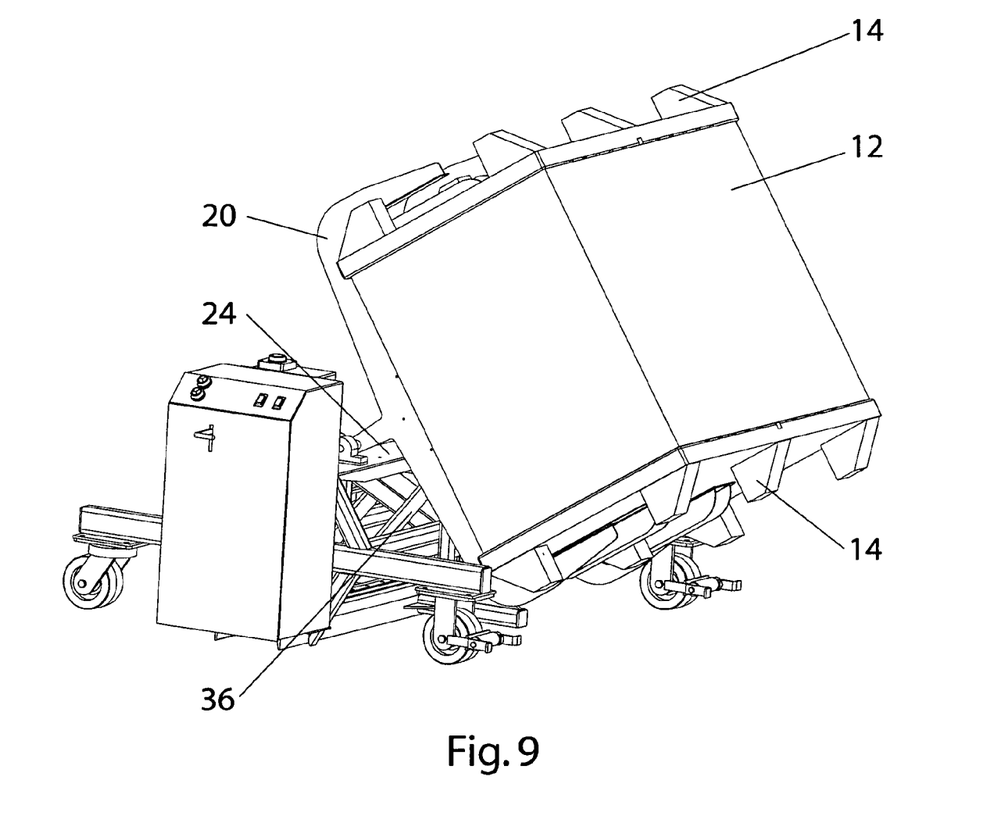
FIG. 9 is a right side perspective view of the paper turner with the paper stack in the final stage of the turning operation.

As the scissor mechanism 36 raises the moving support beam 24, the second module roller 46 (on the opposite side of the turner 10) contacts the ramp formed by the second track switch lever 54 and the second rotation ramp 56. As scissor mechanism 36 completes its upward travel path, the second rotation mechanism moves the rotating module 20 through the rotating position shown in FIG. 9, and continues to a vertical orientation with the paper stack 12 rotated 180° from its original position.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

We claim:
1. An automated load turning device comprising:
a main frame,
a rotating module pivotally mounted in said main frame,
a means for securing a load to be turned within said rotating module, and
a moving support beam to raise and lower said rotating module, said moving support beam being powered by a motor; wherein
a first stroke of said moving support beam causes a first rotation mechanism to rotate said rotating module 90° so that the load is in a horizontal position, and
a second stroke of said moving support beam causes a second rotation mechanism to rotate said rotating module another 90°, so that the load is rotated 180° from its original position,
wherein during an upward movement of said moving support beam, rollers in each said rotation mechanism are raised above a corresponding track switch lever, each said track switch lever then being lowered to form a track comprising said track switch lever and a rotation ramp, each said track moving the load through a stage of rotation during a designated stroke of said moving support beam.

2. An automated load turning device comprising:
a main frame,
a rotating module pivotally mounted in said main frame,
a means for securing a load to be turned within said rotating module, and
a moving support beam to raise and lower said rotating module, said moving support beam being powered by a motor; wherein
a first stroke of said moving support beam causes a first rotation mechanism to rotate said rotating module 90° so that the load is in a horizontal position,
a second stroke of said moving support beam causes a second rotation mechanism to rotate said rotating module another 90°, so that the load is rotated 180° from its original position, and
when the load is in said horizontal position, a slide is moved within said rotating module to move a center of gravity of the load, thereby causing said second rotation mechanism to operate on said rotating module during said second stroke,
during an upward movement of said moving support beam, rollers in each said rotation mechanism are raised above a corresponding track switch lever, each said track switch lever then being lowered to form a track comprising said track switch lever and a rotation ramp, each said track moving the load through a stage of rotation during a designated stroke of said moving support beam.

3. An automated load turning device comprising:
a main frame,
a rotating module pivotally mounted in said main frame,
a means for securing a load to be turned within said rotating module, and
a moving support beam to raise and lower said rotating module, said moving support beam being powered by a motor; wherein
during an upward movement of said moving support beam, rollers in a first and a second rotation mechanism are raised above a corresponding track switch lever, each said track switch lever then being lowered to form a track comprising said track switch lever and a rotation ramp, each said track moving the load through a stage of rotation during a designated stroke of said moving support beam; and wherein
a first stroke of said moving support beam causes said first rotation mechanism to rotate said rotating module 90° so that the load is in a horizontal position,
when the load is in said horizontal position, a slide is moved within said rotating module to move a center of gravity of the load, thereby causing said second rotation mechanism to operate on said rotating module during said second stroke, and
a second stroke of said moving support beam causes said second rotation mechanism to rotate said rotating module another 90°, so that the load is rotated 180° from its original position.

4. The automated load turning device of claim 3 wherein:
said moving support beam is driven by a scissor mechanism.

5. The automated load turning device of claim 3 wherein:
said moving support beam is mounted on linear bearings that move up and down a pair of guide rods.

6. The automated load turning device of claim 3 wherein:
said means for securing said load in said rotating module comprises a pair of sliding clamps mounted on a mounting bar.

* * * * *